No. 656,466. Patented Aug. 21, 1900.
J. C. MINOR.
ART OF IMPROVING MINERAL WELLS.
(Application filed Apr. 30, 1900.)
(No Model.)
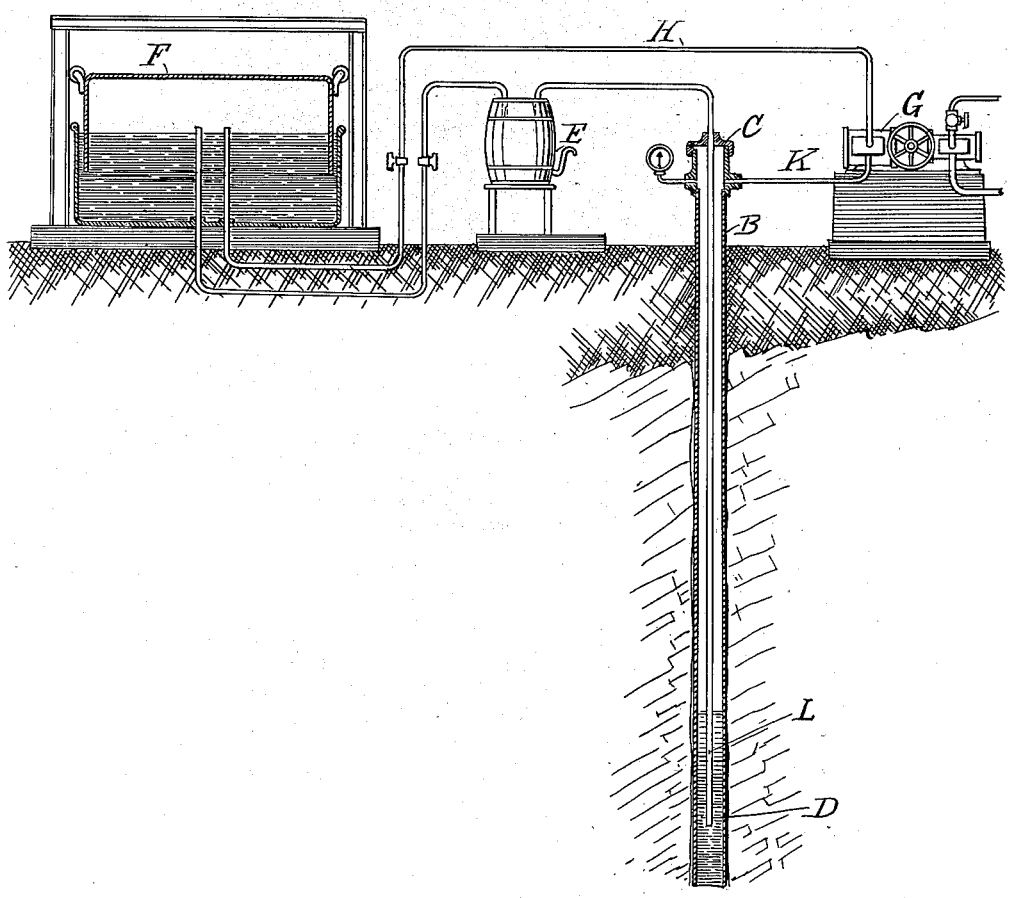
Witnesses:
Samuel W. Balch
George H. Gilman
Inventor,
John C. Minor,
by Thomas Ewing, Jr.,
Attorney

UNITED STATES PATENT OFFICE.

JOHN C. MINOR, OF NEW YORK, N. Y.

ART OF IMPROVING MINERAL WELLS.

SPECIFICATION forming part of Letters Patent No. 656,466, dated August 21, 1900.

Application filed April 30, 1900. Serial No. 14,972. (No specimens.)

*To all whom it may concern:*

Be it known that I, JOHN C. MINOR, a citizen of the United States of America, and a resident of the borough of Manhattan, city, county, and State of New York, have invented certain new and useful Improvements in the Art of Improving Mineral Wells, of which the following is a specification.

Mineral wells whose waters contain, among other ingredients, various salts which are held in solution as bicarbonates by means of an excess of carbon dioxid, with which such wells are naturally charged, occur, among other places, in the vicinity of Saratoga, New York, where their products of mineral water and carbon dioxid or carbonic-acid gas are utilized industrially as articles of commerce. Many of these wells after flowing spontaneously for a time become inactive or non-flowing, their products deteriorate in quantity or quality, and hence the business of operating such wells commercially is liable to the hazard of a failure of the sources of supply. A very important cause of this failure is due to a deficiency in carbonic-acid gas or carbon dioxid, whose presence in excess is necessary to maintain some of the salts contained in the water in a soluble form as bicarbonates. When the water loses the excess necessary for solution, these salts, particularly the lime, magnesia, and iron salts, are precipitated in an insoluble form as carbonates and, falling to the bottom of the well, they obstruct the minute inlets through which water and gas obtain entrance to the well, and the mineral water, losing some of its most important ingredients, becomes worthless for medicinal or table use. I have discovered that such wells can be revived, the quantity of their products increased, and the quality of the mineral water maintained permanently by charging the water in the well with carbon dioxid. This causes the water to redissolve the deposits above referred to, thereby opening the gas and water passages and restoring the conditions necessary to insure a permanent supply of an unimpaired product.

My process may be applied to reviving a well whenever or so often as the well ceases to act spontaneously or deteriorates with respect to the quality of the water, and the process may then be discontinued or it may be applied continually or at sufficiently-frequent intervals to prevent any deterioration in the well products, and thus to maintain an improved and increased production from the well.

The best method known to me for reviving wells or maintaining them against deterioration is one that may be used to operate the wells continuously. It will now be described. It consists in maintaining an atmosphere of carbon dioxid above the surface of the water of the well outside of the discharge-pipe under a pressure sufficient properly to charge the water in the well, while at the same time forcing or aiding in forcing the flow. As hereinafter described and illustrated, the process of charging the well while flowing is accomplished by providing a double column of water in the well. The outer column of water is subjected to the charging-pressure of carbon dioxid, which forces the water downward against its natural tendency to find its level. The effect of this opposition of forces is to charge the water acted upon with carbon dioxid and cause the escape of the charged water in the direction of least resistance, which way is upward through the discharge-pipe. The degree of pressure in this process is modified largely by the distance below the level of the water at which the charged water obtains an avenue of escape from pressure, so that it is possible by careful adjustment of the length of the discharge-pipe to adapt the pressure to the existing requirements. At the temperatures found in such wells and under the conditions of pressure herein stated the water may be caused to absorb a large excess of carbon dioxid and will consequently redissolve the salts deposited in the well and its passages, as above described. There is no waste of carbon dioxid in my process, since all the gas used in the operation, together with all the surplus gas obtained, passes back into the storage-tank, as will hereinafter be described.

While many forms of apparatus may be used for carrying out my improved process, I shall describe a suitable apparatus for putting my invention into practice.

In the accompanying sheet of drawing the figure shows a vertical section through a mineral well to which my apparatus is applied.

The apparatus shown in the figure is one which I have used with advantage.

As shown in the drawing, the well A has a lining tube or casing B, which extends down the well to a depth sufficient to exclude surface water. The top of this casing has a well-head C, sealed so that the tube can be used as a gas-pipe or pressure-chamber for charging the well. If the well has not a suitable casing, then a gas-tube corresponding to this is inserted and extended to a point a short distance above the place where mineral water and gas obtain entrance to the well. If necessary to exclude surface water, the gas-tube is sealed to the wall of the well in any suitable way, as by means of a seed-bag. Within the casing or gas-pipe is placed a discharge-pipe D. The diameter of this pipe should be about one-half that of the gas-pipe, and it should extend below the water-level to a distance about three times as great as the distance from the water-level to the ground-surface. The upper end of the discharge-pipe passes by a gas-tight union through the well-head C and opens into a separator E of suitable construction, wherein any excess of gas in the water is collected and led to the reservoir F. Above the lower end of the discharge-pipe one or more perforations L are made for the purpose of permitting charged water to escape into the discharge-pipe, and thereby prevent the water in the gas-pipe from being depressed below the discharge-pipe. Thus a body of water is always present in the outside or gas pipe, forming a water seal above the end of the discharge-pipe and preventing a waste of gas. A suitable pump G is provided for drawing the gas through a pipe H and forcing it under pressure through a pipe K into the upper end of the gas-pipe. Suitable valves are provided for controlling the connections above described.

The operation of the apparatus in my process is as follows: I subject the water to compressed carbon dioxid by maintaining an atmosphere of the gas under pressure above the water in the well while the well is flowing, with the result that it will absorb a quantity of the gas, this quantity varying with the temperature of the water and the pressure to which the gas is subjected. In the apparatus illustrated this is done by creating pressure in the gas-pipe B outside of the discharge-pipe. To effect this, the pressure-pump draws carbon dioxid from the reservoir and forces it under pressure to the gas-pipe outside the discharge-pipe. The gas so forced into the gas-pipe is in direct contact, under pressure, with the water of the well, which absorbs a quantity varying with the temperature and pressure. The excess of gas thus taken up by the water acts upon the precipitated carbonates, changing them into soluble bicarbonates which pass into solution in the water, thus freeing the water and gas passages leading into the well from the mechanical obstruction of the precipitated salts and opening the way to a larger influx of gas and water. The escape of the charged water through the discharge-pipe makes the process a continuous one, so that an increased flow is promoted and an improved condition is maintained. I have found after the well has thus been revived that it is desirable to continue the process; but the pressure need not be so great, because the natural gas-pressure is increased and supplements the artificial pressure.

I do not claim to have discovered that carbon dioxid compressed will lift the water, nor is it new to charge the contents of a closed vessel for the purpose of changing precipitated carbonates into soluble bicarbonates. What I claim is that my process charges the water in a well while the well is flowing; that it effects a solution of precipitated carbonates or prevents precipitation thereof by charging the water with carbon dioxid, not in a closed vessel, but in a flowing well; that such mineral wells may be thus revived, improved and maintained, and that the results thus obtained are new to the art of operating mineral wells of the class described.

Without limiting myself to the details shown, what I claim, and desire to secure by Letters Patent of the United States, is—

1. The method of improving mineral wells of the class described, which consists in causing the water to redissolve deposits, or maintain salts in solution, by charging it with carbon dioxid, substantially as described.

2. The method of improving mineral wells of the class described, which consists in forcing the water out of the well and simultaneously charging it, by means of carbon-dioxid gas under pressure, substantially as described.

3. The method of improving mineral wells of the class described, which consists in forcing the water out of the well and simultaneously charging it, by means of carbon-dioxid gas under pressure, and thereby causing it to redissolve certain salts, or to maintain them in solution, substantially as described.

4. The method of improving mineral wells of the class described, which consists in forcing the water out of the well and in causing it to dissolve certain salts, by charging the water in the well with carbonic-dioxid gas under pressure, substantially as described.

Signed by me in New York city this 28th day of April, 1900.

JOHN C. MINOR.

Witnesses:
THOMAS EWING, Jr.,
SAMUEL W. BALCH.